United States Patent
Hattori

(10) Patent No.: US 10,353,567 B2
(45) Date of Patent: Jul. 16, 2019

(54) ELECTRONIC DEVICE

(71) Applicant: KYOCERA Corporation, Kyoto (JP)

(72) Inventor: Shigeto Hattori, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 283 days.

(21) Appl. No.: 15/032,962

(22) PCT Filed: Nov. 27, 2014

(86) PCT No.: PCT/JP2014/005946
§ 371 (c)(1),
(2) Date: Apr. 28, 2016

(87) PCT Pub. No.: WO2015/079700
PCT Pub. Date: Jun. 4, 2015

(65) Prior Publication Data
US 2016/0253064 A1    Sep. 1, 2016

(30) Foreign Application Priority Data

Nov. 28, 2013 (JP) .................. 2013-246428
Nov. 28, 2013 (JP) .................. 2013-246430

(51) Int. Cl.
*G06F 3/0488* (2013.01)
*G06F 3/0481* (2013.01)
(Continued)

(52) U.S. Cl.
CPC ........... *G06F 3/0488* (2013.01); *G06F 1/169* (2013.01); *G06F 1/1626* (2013.01);
(Continued)

(58) Field of Classification Search
CPC ............... G06F 3/0488; G06F 3/04817; G06F 3/04812; G06F 3/165; H04M 1/0281; H04M 1/72583
See application file for complete search history.

(56) References Cited

U.S. PATENT DOCUMENTS 6,323,884 B1    11/2001   Bird et al.
7,966,573 B2 *  6/2011    Dodge .................. G06F 3/0481
                                                          345/173
(Continued)

FOREIGN PATENT DOCUMENTS

JP    2000-305685 A    11/2000
JP    2010-122972 A    6/2010
(Continued)

OTHER PUBLICATIONS

An Office Action issued by the Japanese Patent Office dated Mar. 21, 2017, which corresponds to Japanese Patent Application No. 2013-246428 and is related to U.S. Appl. No. 15/032,962; with concise explanation; 4pp.

(Continued)

*Primary Examiner* — Shourjo Dasgupta
(74) *Attorney, Agent, or Firm* — Studebaker & Brackett PC

(57) ABSTRACT

Operability is improved when operating an electronic device with one hand. An electronic device (1) includes a touch sensor on a front surface and a touch sensor on a back surface. A controller (14) causes a cursor for selecting an icon positioned at an upper portion of a display (11) to be displayed upon detecting an operation on the touch sensor (13) on the back surface and executes processing corresponding to an icon selected by the cursor upon detecting an operation on the touch sensor (12) on the front surface. The controller (14) also executes processing related to a phone call application upon detecting an operation on the touch sensor (13) on the back surface during a phone call.

29 Claims, 12 Drawing Sheets

(51) Int. Cl.
*G06F 3/16* (2006.01)
*H04M 1/02* (2006.01)
*H04M 1/656* (2006.01)
*H04M 1/725* (2006.01)
*G06F 1/16* (2006.01)
*H04M 1/23* (2006.01)

(52) U.S. Cl.
CPC ...... *G06F 3/04812* (2013.01); *G06F 3/04817* (2013.01); *G06F 3/165* (2013.01); *H04M 1/0281* (2013.01); *H04M 1/656* (2013.01); *H04M 1/72583* (2013.01); *H04M 1/233* (2013.01); *H04M 2250/22* (2013.01)

(56) References Cited

U.S. PATENT DOCUMENTS

| | | | |
|---|---|---|---|
| 8,547,467 B2 | 10/2013 | Kouda et al. | |
| 8,629,929 B2 | 1/2014 | Kouda et al. | |
| 8,698,764 B1* | 4/2014 | Karakotsios | G06F 1/1692 345/173 |
| 8,712,478 B2 | 4/2014 | Inami | |
| 9,575,630 B2 | 2/2017 | Kouda et al. | |
| 2003/0234768 A1* | 12/2003 | Rekimoto | G06F 1/1626 345/169 |
| 2007/0123224 A1* | 5/2007 | Nishiyama | H04M 3/4931 455/414.1 |
| 2007/0268261 A1 | 11/2007 | Lipson | |
| 2010/0298033 A1* | 11/2010 | Lee | G06F 1/1616 455/566 |
| 2011/0012921 A1* | 1/2011 | Cholewin | G06F 1/1626 345/619 |
| 2011/0055585 A1* | 3/2011 | Lee | H04L 9/0844 713/183 |
| 2012/0062564 A1* | 3/2012 | Miyashita | G06F 1/1626 345/419 |
| 2012/0075208 A1* | 3/2012 | Tamiya | G06F 9/453 345/173 |
| 2012/0147242 A1 | 6/2012 | Kouda et al. | |
| 2012/0194446 A1 | 8/2012 | Lin et al. | |
| 2012/0245945 A1* | 9/2012 | Miyauchi | G10L 15/06 704/275 |
| 2012/0276958 A1 | 11/2012 | Inami | |
| 2012/0327122 A1* | 12/2012 | Imamura | G06F 3/04815 345/649 |
| 2013/0007653 A1* | 1/2013 | Stolyarov | G06F 1/1626 715/784 |
| 2013/0042205 A1* | 2/2013 | Tsuda | G06F 3/0483 715/811 |
| 2013/0100036 A1* | 4/2013 | Papakipos | G06F 1/1643 345/173 |
| 2013/0260836 A1 | 10/2013 | Tsunoda et al. | |
| 2013/0293757 A1 | 11/2013 | Kouda et al. | |
| 2013/0321340 A1* | 12/2013 | Seo | G06F 1/1641 345/174 |
| 2014/0082564 A1 | 3/2014 | Kouda et al. | |
| 2014/0139443 A1* | 5/2014 | Kao | G06F 3/041 345/173 |
| 2017/0046047 A1 | 2/2017 | Kouda et al. | |

FOREIGN PATENT DOCUMENTS

| | | |
|---|---|---|
| JP | 2012-073698 A | 4/2012 |
| JP | 2012-84137 A | 4/2012 |
| JP | 2012-128473 A | 7/2012 |
| JP | 2012-160176 A | 8/2012 |
| JP | 2012-203433 A | 10/2012 |
| JP | 2012-209683 A | 10/2012 |
| JP | 2012-230567 A | 11/2012 |
| JP | 2013-008340 A | 1/2013 |
| JP | 2013-165334 A | 8/2013 |
| JP | 2013-207554 A | 10/2013 |

OTHER PUBLICATIONS

An Office Action issued by the Japanese Patent Office dated Mar. 28, 2017, which corresponds to Japanese Patent Application No. 2013-246430 and is related to U.S. Appl. No. 15/032,962; with concise explanation; 5pp.

International Search Report of PCT/JP2014/005946 dated Mar. 3, 2015.

Written Opinion of the International Searching Authority with Concise Explanation of PCT/JP2014/005946 dated Mar. 3, 2015.

* cited by examiner

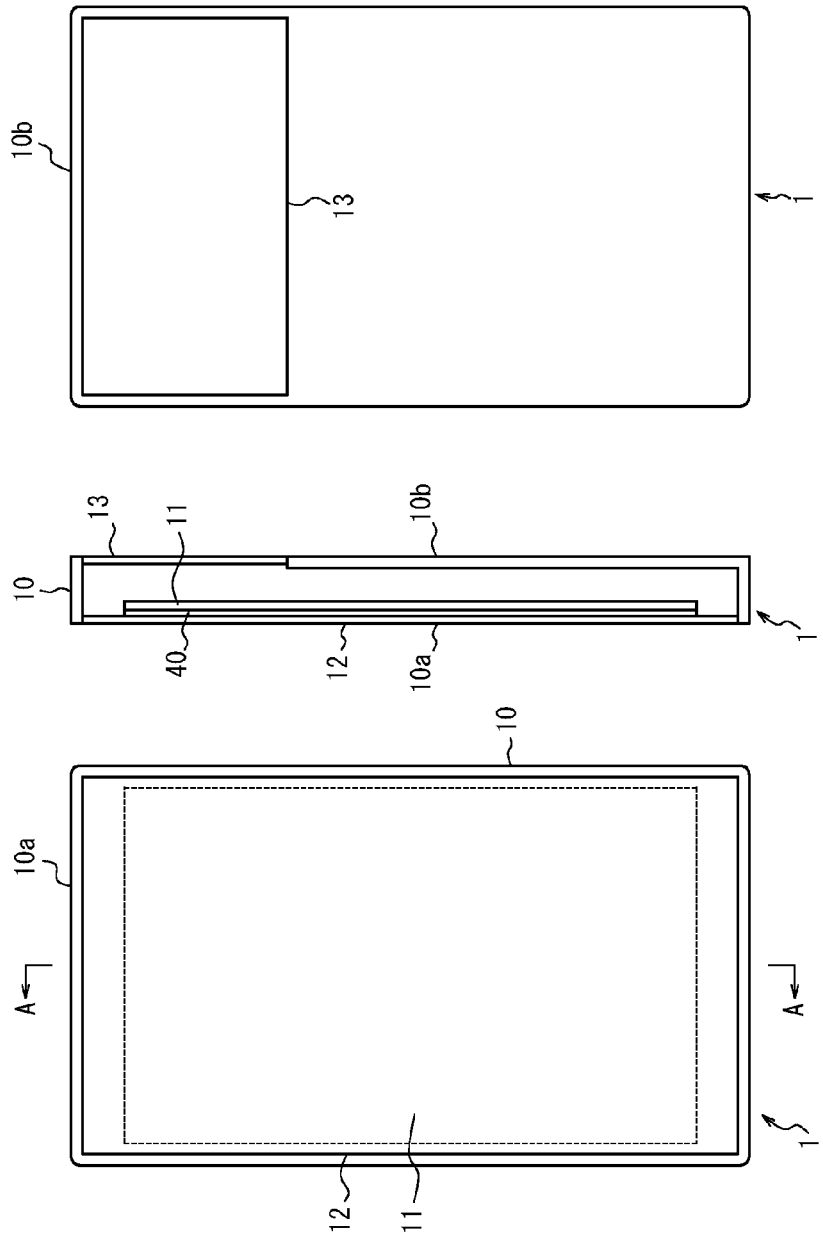

ELECTRONIC DEVICE

CROSS-REFERENCE TO RELATED APPLICATIONS

This application claims priority to and the benefit of Japanese Patent Application Nos. 2013-246428 and 2013-246430, both filed Nov. 28, 2013, the entire contents of which are incorporated herein by reference.

TECHNICAL FIELD

This disclosure relates to an electronic device that includes a touch sensor on the back surface thereof.

BACKGROUND

In recent years, more and more electronic devices, such as mobile phones, are provided with a touch sensor that detects contact by a user. There are many known systems for detecting contact, such as a resistive film system and a capacitive system. All of these systems detect contact by a contacting object such as the user's finger or a stylus pen.

There are also electronic devices that, in addition to the front surface, also include a touch sensor on the back surface. For example, JP 2012-230567 A (PTL 1) discloses a mobile terminal that includes two touch sensors, one on the front surface and one on the back surface, and that based on a predetermined correspondence relationship associated with the usage state, accepts input to a first back surface or a second back surface as input to a first front surface or a second front surface, thereby increasing user-friendliness.

CITATION LIST

Patent Literature

PTL 1: JP 2012-230567 A

SUMMARY

Technical Problem

When operating an electronic device with one hand, it is necessary to operate objects such as icons and tabs displayed on the front surface with the thumb while holding the sides and the back surface of the electronic device with the other four fingers and the palm of the hand. If the electronic device is large, however, objects displayed at the upper portion of the front surface cannot be reached with the thumb, making it difficult to operate the electronic device with one hand.

When talking on the phone, the electronic device generally needs to be placed near the ear while being held with one hand. Therefore, the user cannot view the display of the electronic device and operate the touch sensor while talking on the phone at the same time, making it difficult to execute processing related to a phone call application during a phone call. In order to execute processing related to a phone call application during a phone call, the user needs to remove the mobile terminal from the ear in order to operate the touch sensor, turn the screen's backlight on if the backlight has turned off, then cause an icon related to predetermined processing to be displayed on the display and operate the icon. During this time, the phone call is interrupted. Furthermore, multiple operations are required to cause the icon related to predetermined processing to be displayed on the display, which is inconvenient.

Therefore, it would be helpful to provide an electronic device with improved operability when operating the electronic device with one hand.

Solution to Problem

In order to resolve the aforementioned problem, an electronic device according to this disclosure includes a touch sensor on a front surface and a touch sensor on a back surface; and a controller configured to cause a cursor for selecting an icon positioned at an upper portion of a display to be displayed upon detecting an operation on the touch sensor on the back surface and configured to execute processing corresponding to an icon selected by the cursor upon detecting an operation on the touch sensor on the front surface.

In the electronic device according to this disclosure, the cursor that the controller causes to be displayed may be for selecting an icon in a predetermined area positioned at the upper portion of the display.

In the electronic device according to this disclosure, while the cursor is being displayed, the controller may gray out an area of the display other than the predetermined area.

In the electronic device according to this disclosure, while the cursor is being displayed, the controller may be configured not to execute the processing corresponding to the icon selected by the cursor until detecting an operation on the touch sensor on the front surface.

Another electronic device according to this disclosure includes a touch sensor on a front surface and a touch sensor on a back surface; and a controller configured to execute processing related to a phone call application upon detecting an operation on the touch sensor on the back surface during a phone call.

In the electronic device according to this disclosure, the controller may terminate the phone call upon detecting an operation on the touch sensor on the back surface during the phone call.

In the electronic device according to this disclosure, the controller may record the phone call upon detecting an operation on the touch sensor on the back surface during the phone call.

In the electronic device according to this disclosure, the controller may raise a volume of a speaker upon detecting a first operation on the touch sensor on the back surface during the phone call and lower the volume of the speaker upon detecting a second operation on the touch sensor on the back surface during the phone call.

The electronic device according to this disclosure may further include a pressure detector configured to detect pressure on the touch sensor on the back surface, and the controller may detect an operation on the touch sensor on the back surface when data based on pressure detected by the pressure detector satisfies a predetermined standard.

Advantageous Effect

According to this disclosure, operability can be improved when operating an electronic device with one hand.

BRIEF DESCRIPTION OF THE DRAWINGS

In the accompanying drawings:

FIGS. 2A, 2B, and 2C illustrate an example of a mounting structure of the electronic device according to Embodiment 1;

DETAILED DESCRIPTION

The following describes embodiments in detail with reference to the drawings.

Embodiment 1

Figure 1:
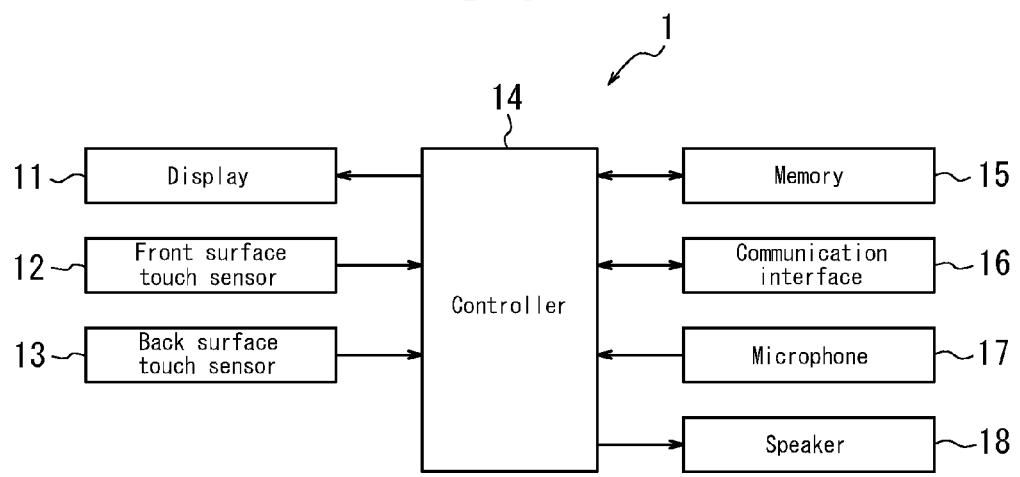
FIG. 1 is a block diagram schematically illustrating the structure of an electronic device according to Embodiment 1.

FIG. 1 is a block diagram schematically illustrating the structure of an electronic device according to Embodiment 1. In the example illustrated in FIG. 1, an electronic device 1 includes a display 11, a front surface touch sensor 12, a back surface touch sensor 13, a controller 14, a memory 15, a communication interface 16, a microphone 17, and a speaker 18.

The display 11 displays images of characters, photographs, icons (objects for operation), and the like. The display 11 may be configured using a Liquid Crystal Display (LCD), an Organic Electroluminescence Display (OELD), or the like. For example, on a home screen, the display 11 displays icons for performing operations for a telephone call, e-mail, Internet communication, taking a photograph, and the like.

The front surface touch sensor 12 detects contact or release of contact by a finger on an input face of the front surface touch sensor 12. The front surface touch sensor 12 detects the contact position on the input face and outputs a signal indicating the detected contact position to the controller 14. The front surface touch sensor 12 is configured with a transparent member and disposed in overlap on the front surface of the display 11. The user visually confirms images on the display 11 through the transparent front surface touch sensor 12 and causes the electronic device 1 to execute predetermined processing by operating the front surface touch sensor 12 at the display position of an icon displayed by the display 11. An operation on the touch sensor as referred to here includes all operations to contact the finger(s) to the touch sensor, including a touch, tap, double tap, slide, flick, swipe, and the like.

The back surface touch sensor 13 is disposed on the back surface of the electronic device 1 in order to improve operability when operating the electronic device 1 with one hand. The back surface touch sensor 13 detects contact or release of contact by a finger on an input face of the back surface touch sensor 13 and outputs the results of detection to the controller 14. The front surface touch sensor 12 and the back surface touch sensor 13 may, for example, be implemented with a known system such as a resistive film system or a capacitive system.

Upon detecting an operation on the front surface touch sensor 12 by a signal input from the front surface touch sensor 12, the controller 14 executes processing corresponding to the icon displayed at the contact position.

Upon detecting a predetermined operation (for example, a tap) on the back surface touch sensor 13 by a signal input from the back surface touch sensor 13, the controller 14 causes a cursor for selecting an icon positioned at the upper portion of the display 11 to be displayed. After the cursor is moved and an icon is selected by a predetermined operation (for example, a slide) on the back surface touch sensor 13, then upon detecting a predetermined operation on the front surface touch sensor 12 (for example, a tap at any location within the front surface touch sensor 12), the controller 14 executes processing corresponding to the icon selected by the cursor. The cursor allows selection of an icon in a predetermined area at the upper portion of the display 11. For example, in a screen on which a plurality of icons are displayed, the cursor allows selection of one icon from among the plurality of icons displayed up to the first or second row from the top of the display 11.

The memory 15 may be configured with a semiconductor memory or the like. The memory 15 stores a variety of information, programs for causing the electronic device 1 to operate, and the like and also functions as a working memory.

The communication interface 16 allows wireless communication with a base station or other communication device.

The microphone 17 picks up surrounding sound, such as speech by the user. The sound picked up by the microphone 17 is converted to an electric signal and transmitted to the controller 14.

The speaker 18 outputs sounds such as voice, music, and a ringtone.

FIGS. 2A, 2B, and 2C illustrate an example of a mounting structure of the electronic device 1 according to Embodiment 1. FIG. 2A is a front view, FIG. 2B is a cross-sectional view along the A-A line in FIG. 2A, and FIG. 2C is a back view.

In FIGS. 2A to 2C, illustration of constituent elements other than a housing 10, the display 11, the front surface touch sensor 12, the back surface touch sensor 13, and a joining member 40 is omitted. Apart from the constituent elements illustrated in FIGS. 2A to 2C, the electronic device 1 may also for example include elements such as the controller 14, a substrate, and a variety of components. Typically, the microphone 17 is disposed at the bottom of the front surface touch sensor 12, and the speaker 18 is disposed at the top of the front surface touch sensor 12.

As illustrated in FIGS. 2A to 2C, the front surface touch sensor 12 is disposed on a front surface 10a of the housing 10 (which for example is a metal or resin case) and is supported by the housing 10.

The display 11 is disposed inside the housing 10. For example, the display 11 may be adhered to the back side of the front surface touch sensor 12 and directly secured to the inside of the housing 10 or secured to a substrate, a display holder, or the like disposed inside the housing 10. In FIGS. 2A to 2C, the display 11 is adhered to the front surface touch sensor 12 with the joining member 40 therebetween. As illustrated in FIG. 2B, if the display 11 is disposed on the back side of the front surface touch sensor 12, then when the front surface touch sensor 12 and the display 11 constitute a touch panel, a user interface can freely be displayed on the display 11 and user operation can be detected by the front surface touch sensor 12. Note that the joining member 40 may be thermosetting or ultraviolet curable adhesive, double-sided tape, or the like. The joining member 40 may, for example, be optical elasticity resin, which is clear and colorless acrylic ultraviolet curing adhesive.

The back surface touch sensor 13 is disposed on a back surface 10b of the housing 10 so as to include a range that can be contacted by the index finger when the electronic device 1 is held in one hand, and the back surface touch sensor 13 is supported by the housing 10. For example, as illustrated in FIGS. 2B and 2C, the back surface touch sensor 13 is disposed on the upper portion of the back surface 10b of the housing 10.

Figure 3A:
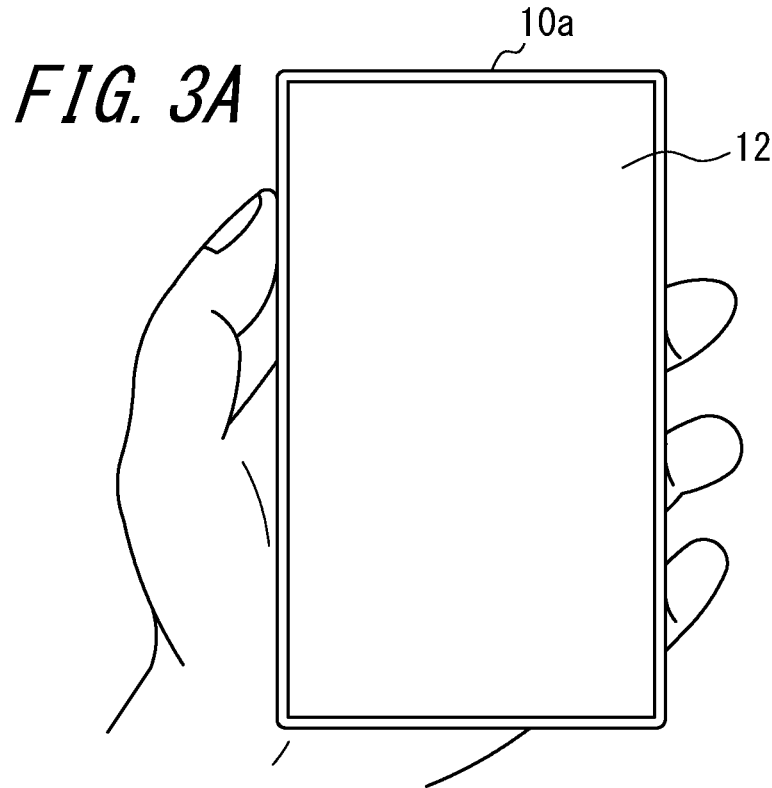
FIGS. 3A and 3B illustrate the user holding the electronic device in the left hand.
Figure 3B:
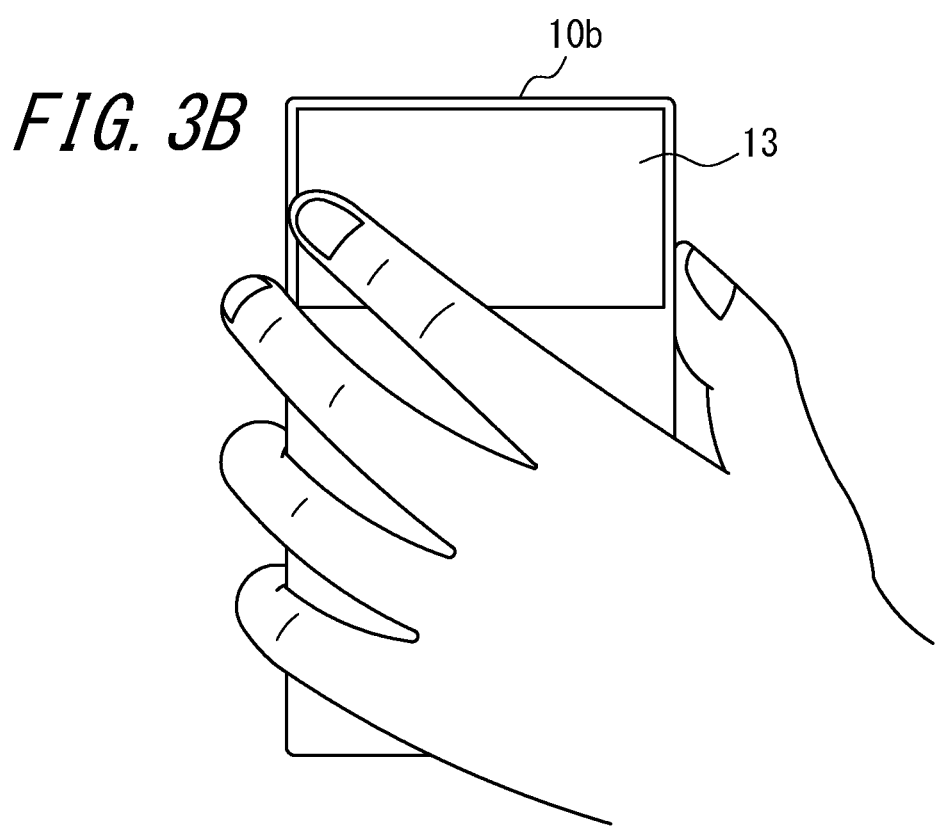

FIGS. 3A and 3B illustrate the user holding the electronic device 1 in the left hand. FIG. 3A is a view from the front surface, and FIG. 3B is a view from the back surface. As illustrated in FIG. 3B, when the electronic device 1 is held in the left hand, the index finger is positioned on the back surface touch sensor 13. Accordingly, by simply bending the index finger, the user can operate (touch, tap, double tap, flick, or the like) the back surface touch sensor 13 easily without moving the other fingers. In this embodiment, the back surface touch sensor 13 is limited to being disposed at a position that can be contacted by the index finger, but the back surface touch sensor 13 may be disposed over a wider area.

Figure 4:
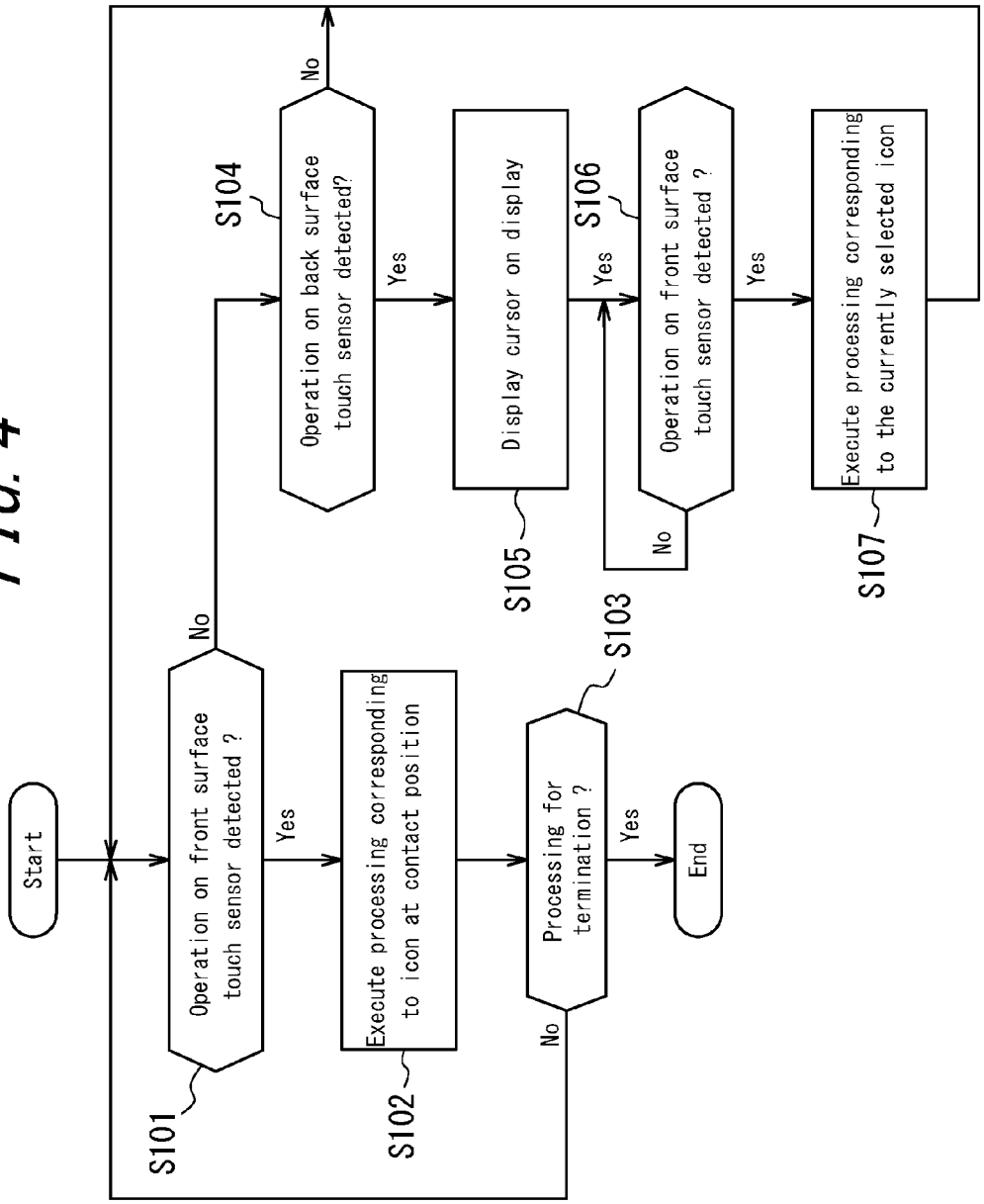
FIG. 4 is a flowchart illustrating icon operation processing by the electronic device according to Embodiment 1.

Next, processing by the electronic device 1 according to one of the embodiments of this disclosure is described. FIG. 4 is a flowchart illustrating icon operation processing by the electronic device 1 according to Embodiment 1.

Upon detecting a predetermined operation on the front surface touch sensor 12 by a signal input from the front surface touch sensor 12 (step S101: Yes), the controller 14 executes processing corresponding to the icon displayed at the contact position (step S102). For example, when the display 11 is displaying a browser icon for opening an Internet connection, then upon detecting a tap with the front surface touch sensor 12 at the display position of the browser icon, the controller 14 opens an Internet connection with the communication interface 16, accesses a predetermined URL, and causes the acquired site screen to be displayed on the display 11. When the processing in step S102 is processing to terminate the browser of the electronic device 1 (step S103: Yes), the controller 14 terminates processing and for example causes a home screen (standby screen) to be displayed on the display 11.

Upon detecting a predetermined operation (for example, a tap) on the back surface touch sensor 13 by a signal input from the back surface touch sensor 13 (step S104: Yes), the controller 14 causes a cursor for selecting an icon positioned at the upper portion of the display 11 to be displayed on the display 11 (step S105). As long as the cursor allows selection of one icon from among a plurality of icons, the cursor may take any form. For example, a marker may be displayed near the currently selected icon, or the currently selected icon may be caused to blink or be displayed in a color that distinguishes the icon from other icons.

The cursor can be moved within a predetermined area at the upper portion of the display 11 by a predetermined operation (for example, a slide) on the back surface touch sensor 13. After displaying the cursor, upon detecting a predetermined operation (for example, a touch at any location within the front surface touch sensor 12) on the front surface touch sensor 12 (step S106: Yes), the controller 14 executes processing corresponding to the icon selected by the cursor (step S107). In other words, while the cursor is being displayed, the controller 14 does not execute processing corresponding to the icon selected by the cursor until detecting an operation on the front surface touch sensor 12. During that time, the user can move the cursor and select an icon. Specific examples of the processing in steps S105 to S107 are described below.

Figure 5A:
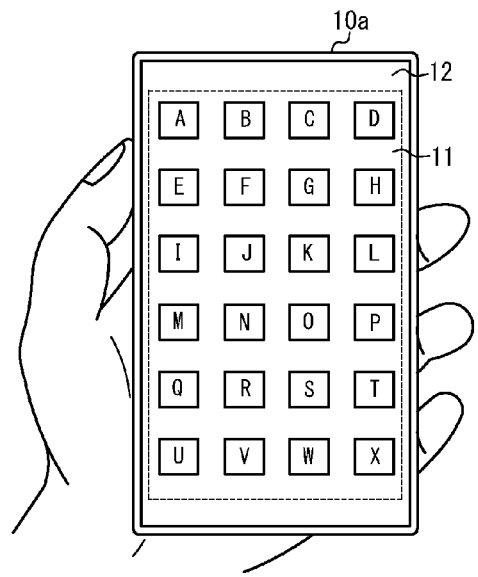
FIGS. 5A, 5B, 5C, and 5D illustrate processing executed by an operation on the back surface touch sensor of the electronic device according to Embodiment 1.
Figure 5B:
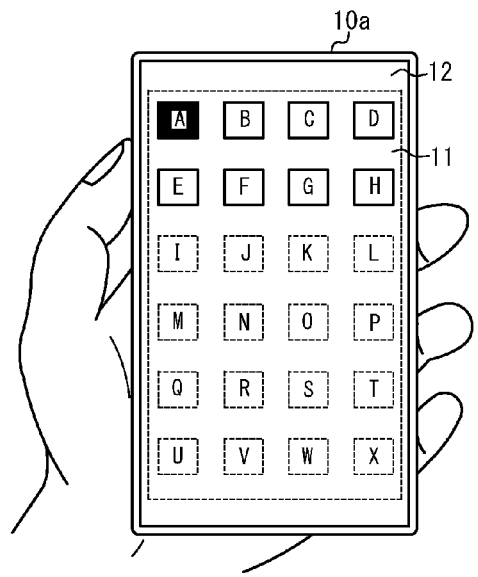

FIGS. 5A to 5D illustrate processing executed by an operation on the back surface touch sensor 13. FIG. 5A illustrates a screen on which a plurality of icons are displayed, such as a home screen or a folder screen. Square icons A to X are illustrated as one example of display, but the shape and number of icons are not limited to this example. When operating the electronic device 1 with one hand, the icons displayed at the upper portion on the screen illustrated in FIG. 5A cannot easily be selected with the thumb. Therefore, in the electronic device 1 according to this disclosure, upon detecting a predetermined operation (for example, a tap) on the back surface touch sensor 13, the controller 14 causes a cursor for selecting an icon in a predetermined area ("selectable area") positioned at the upper portion of the display 11 to be displayed on the display 11, as illustrated in FIG. 5B. FIG. 5B illustrates a state in which icon A is selected by the cursor. The displayed cursor can be eliminated by a predetermined operation. For example, upon detecting a double tap on the back surface touch sensor 13, the controller 14 eliminates the displayed cursor.

Figure 5C:
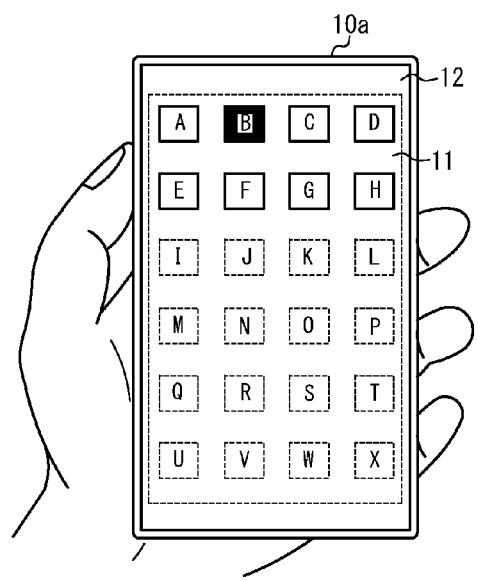
Figure 5D:
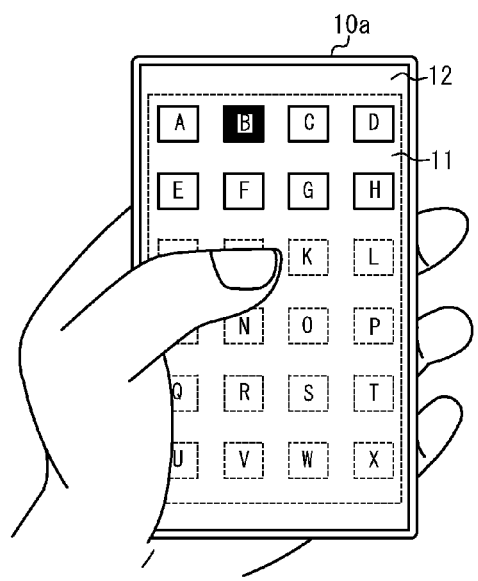

The selectable area is a range assumed to be difficult to reach with the thumb when the user operates the electronic device 1 with one hand. In FIGS. 5A to 5D, the area that includes icons A to H is the selectable area, but the selectable area is not limited to being rectangular. For example, the selectable area may be the area that includes icons A to D, G, H, L, P, T, and X. When causing the cursor to be displayed, the controller 14 preferably makes the selectable area distinguishable by the user, for example by graying out the area other than the selectable area in the display 11. In FIGS. 5B, 5C, and 5D, icons I to X are indicated with a dashed line to indicate that the area other than the selectable area that includes icons A to D is grayed out.

The position of the cursor can be changed within the selectable area by a predetermined operation (for example, a slide) on the back surface touch sensor 13. FIG. 5C illustrates a state in which icon B has been selected by changing the position of the cursor. When moving the cursor within the selectable area by a slide operation on the back surface touch sensor 13, it is hard for the user to slide the index finger horizontally with respect to the electronic device 1 while holding the electronic device 1 with one hand. Therefore, the controller 14 preferably moves the cursor horizontally even when detecting a slide operation in the diagonal direction on the back surface touch sensor 13.

FIG. 5D illustrates a state in which processing corresponding to the selected icon B is executed. Upon detecting a predetermined operation on the front surface touch sensor 12, the controller 14 executes processing corresponding to icon B selected by the cursor. In other words, while an icon is being selected by the cursor, the user can cause processing corresponding to the selected icon to be executed by operating (for example, touching) any portion within the front surface touch sensor 12. Here, by graying out icons I to X, the user can be explicitly informed that even when any one of the icons I to X is operated, processing corresponding to that icon is not executed.

Figure 6:
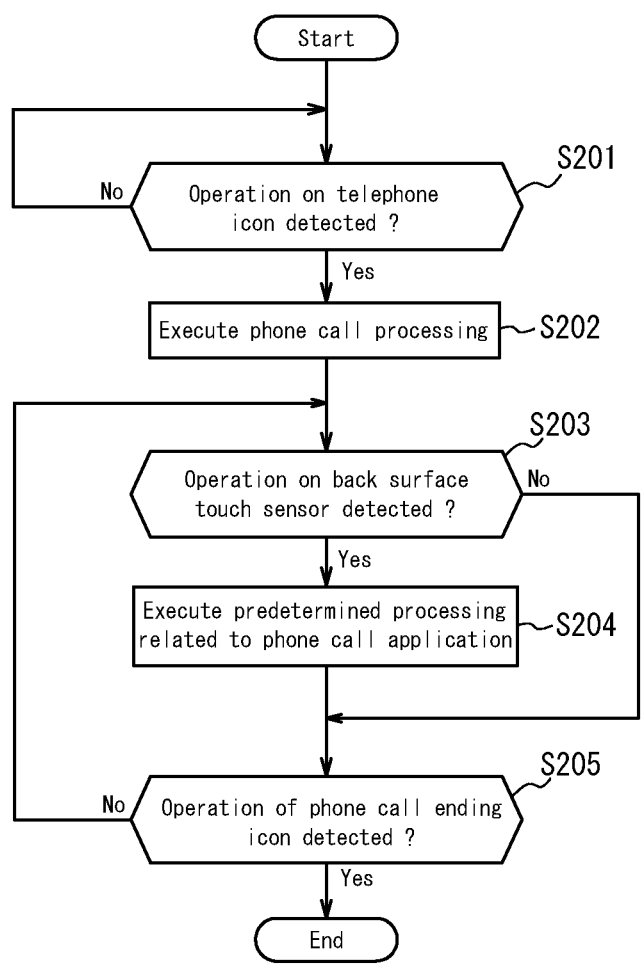
FIG. 6 is a flowchart illustrating processing related to a phone call application by the electronic device according to Embodiment 1.

The controller 14 may be configured to execute predetermined processing related to a phone call application upon detecting an operation on the back surface touch sensor 13 by a signal input from the back surface touch sensor 13 during a phone call. The processing in this case is described with reference to FIG. 6. FIG. 6 is a flowchart illustrating processing related to a phone call application by the electronic device 1 according to Embodiment 1.

When the display 11 is displaying a telephone icon for placing a phone call, then upon detecting an operation with the front surface touch sensor 12 at the display position of the telephone icon (step S201: Yes), the controller 14 executes phone call processing by launching the phone call application and opening a phone line connection with the communication interface 16 after the user inputs a telephone number, thereby allowing the user to hold a phone call with another party once the phone line connection is established (step S202).

Upon detecting a predetermined operation on the back surface touch sensor 13 by a signal input from the back surface touch sensor 13 during a phone call (step S203: Yes), the controller 14 executes predetermined processing related to the phone call application (step S204). Upon detecting an operation at the display position of an end phone call icon for ending the phone call (step S205: Yes), the controller 14 terminates the phone call, ends the phone call processing, and for example causes the home screen (standby screen) to be displayed on the display 11. Specific examples of the predetermined processing in step S204 are described below.

Figure 7:
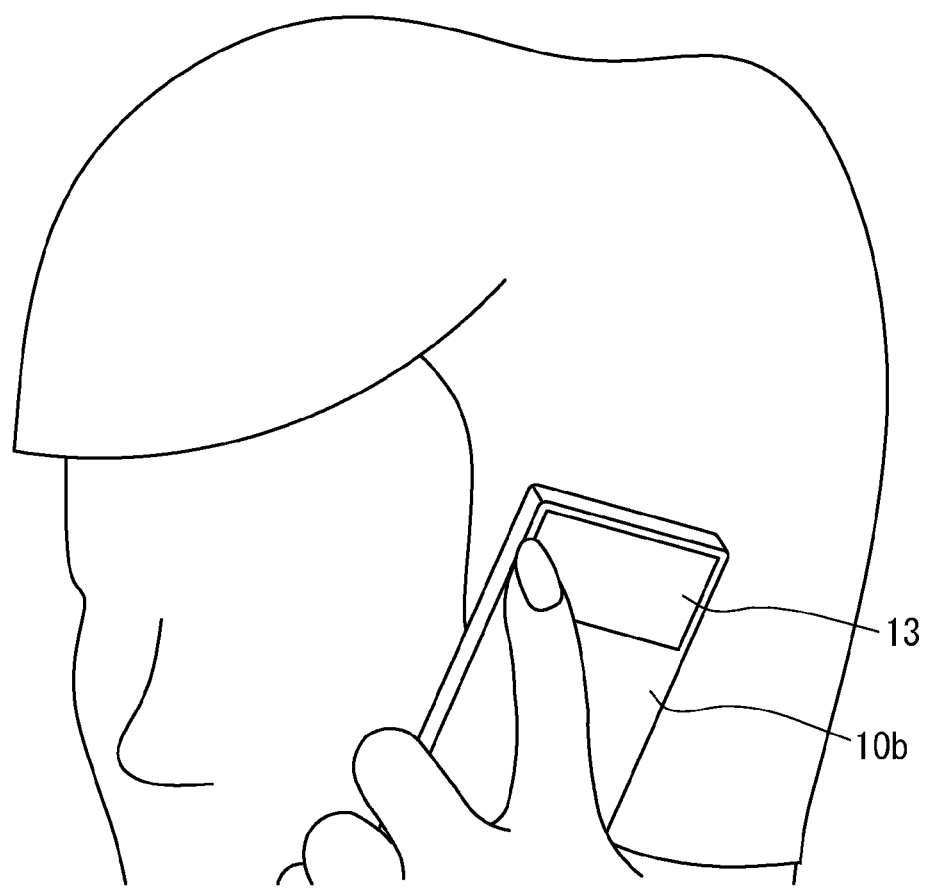
FIG. 7 illustrates the state of holding a phone call using the electronic device according to Embodiment 1.

FIG. 7 illustrates the state of holding a phone call using the electronic device 1. In the state of holding the electronic device 1 near the ear to hold a phone call, the user cannot look at the display 11 to operate the front surface touch sensor 12, making it difficult to cause processing related to a phone call application to be executed during a phone call. As can be seen in FIG. 7, however, the back surface touch sensor 13 can easily be operated by the index finger considering the position of the fingers that hold the electronic device 1. Therefore, in this disclosure, predetermined processing related to the phone call application can be executed by an operation on the back surface touch sensor 13.

For example, in order to adjust the volume of the speaker 18 during a phone call, the following operations are generally necessary: the user needs to remove the electronic device 1 from the ear, turn the screen's backlight on if the backlight has turned off, cause an icon for adjusting the volume to be displayed on the display 11, and then touch the icon. During this time, the phone call (conversation) is interrupted. Therefore, in the electronic device 1 according to this disclosure, the volume of the speaker 18 can also be adjusted by operating the back surface touch sensor 13 during the phone call. In other words, during the phone call the controller 14 raises the volume of the speaker 18 upon detecting a first operation on the back surface touch sensor 13 (for example, a slide upwards from below) and lowers the volume of the speaker 18 upon detecting a second operation on the back surface touch sensor 13 (for example, a slide downwards from above). In this way, the volume of the speaker 18 can easily be adjusted while preventing interruption of the phone call (conversation).

If the volume button of the speaker 18 is disposed on the side of the electronic device 1, the volume button can be pressed while talking on the phone. The finger that operates the volume button differs when holding the electronic device 1 with the right hand and with the left hand, however, resulting in poor operability. For example, the volume button is operated with the index finger when holding the electronic device 1 with the right hand but is operated with the thumb when holding the electronic device 1 with the left hand. Furthermore, when a plurality of buttons are disposed on the side of the electronic device 1, there is a risk of erroneous operation, such as pressing a different button than the volume button. Therefore, operability improves by allowing the volume to be adjusted with an operation on the back surface touch sensor 13.

In order to record a phone call, the following operations are generally necessary: the user needs to remove the electronic device 1 from the ear, turn the screen's backlight on if the backlight has turned off, cause an icon for starting recording to be displayed on the display 11, and then touch the icon. During this time, the phone call (conversation) is interrupted. Therefore, in the electronic device 1 according to this disclosure, a phone call can also be recorded by operating the back surface touch sensor 13 during the phone call. In other words, upon detecting a predetermined operation (for example, a double tap) on the back surface touch sensor 13 during a phone call, the controller 14 records the phone call. In this way, the phone call can easily be recorded while preventing interruption of the phone call (conversation).

In order to terminate (end) a phone call, the following cumbersome operations are generally necessary: the user needs to remove the electronic device 1 from the ear, turn the screen's backlight on if the backlight has turned off, cause an icon for terminating the phone call to be displayed on the display 11, and then touch the icon. Therefore, in the electronic device 1 according to this disclosure, a phone call can also be terminated by operating the back surface touch sensor 13 during the phone call. In other words, upon detecting a predetermined operation (for example, a tap) on the back surface touch sensor 13 during a phone call, the controller 14 terminates the phone call. The phone call can thus be terminated easily. In the flowchart in FIG. 6, the case of terminating the phone call by operating the end phone call icon is illustrated, but when terminating the phone call by an operation on the back surface touch sensor 13, the phone call is terminated in step S204, and the phone call processing ends.

As described above, in the electronic device 1 according to Embodiment 1, upon detecting an operation on the back surface touch sensor 13, the controller 14 causes a cursor for selecting an icon positioned at the upper portion of the display 11 to be displayed, and subsequently, upon detecting an operation on the front surface touch sensor 12, executes processing corresponding to the icon selected by the cursor. Therefore, according to the electronic device 1, the user can select an icon positioned at the upper portion of the display 11 with one hand and cause processing corresponding to the selected icon to be executed. Hence, operability can be improved when operating an electronic device with one hand.

Furthermore, in the electronic device 1 according to Embodiment 1, upon detecting an operation on the back surface touch sensor 13 during a phone call, the controller 14 executes processing related to a phone call application. Therefore, according to the electronic device 1, operability of a phone call application can be improved when operating an electronic device with one hand.

Embodiment 2

Figure 8:
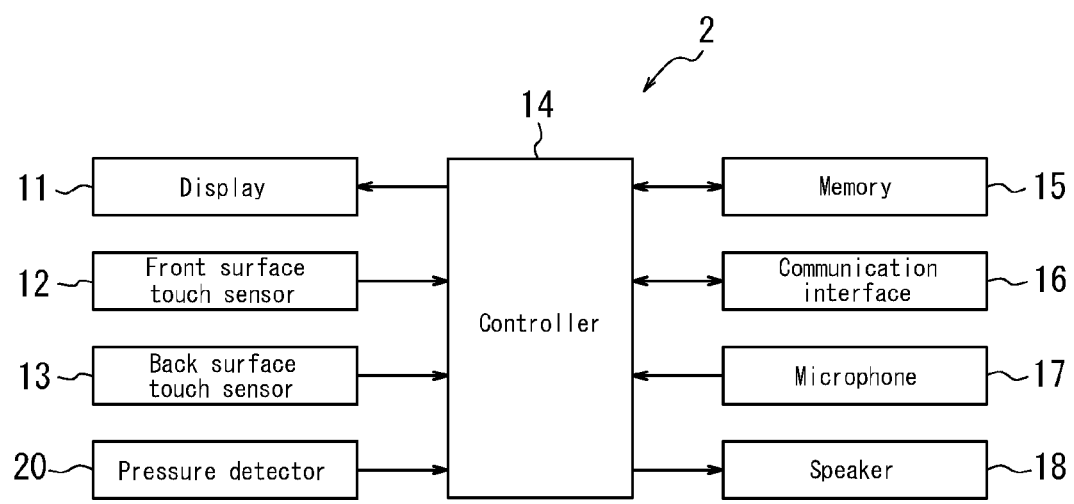
FIG. 8 is a block diagram schematically illustrating the structure of an electronic device according to Embodiment 2.

Next, Embodiment 2 is described. FIG. 8 is a block diagram schematically illustrating the structure of an electronic device according to Embodiment 2. As compared to the electronic device 1 according to Embodiment 1, an electronic device 2 according to Embodiment 2 further includes a pressure detector 20. The remaining structure is identical to that of Embodiment 1. Therefore, the same reference signs are applied, and a description thereof is omitted.

The pressure detector 20 detects pressure when the user performs an operation on the back surface touch sensor 13 and outputs data based on the pressure to the controller 14. The pressure detector 20 for example may be configured using a strain gauge sensor, a piezoelectric element, or the like that experiences a change in physical or electrical characteristics (strain, resistance, voltage, or the like) in response to pressure. When the pressure detector 20 is configured using a piezoelectric element, for example, the voltage value (data based on pressure), which is an electrical characteristic, of the piezoelectric element of the pressure detector 20 changes in accordance with the magnitude of the load (force) of the pressure on the back surface touch sensor 13 (or the speed at which the magnitude of the load changes (acceleration)). Note that instead of a voltage value, the data based on pressure may be the magnitude of the load, the power, the resistance, or the like due to pressure.

The pressure detector 20 may similarly detect pressure when the user performs an operation on the front surface touch sensor 12. In this embodiment, the pressure detector 20 is described as also detecting pressure when the user performs an operation on the front surface touch sensor 12.

The controller 14 acquires the data based on pressure on the back surface touch sensor 13 (and the front surface touch sensor 12) from the pressure detector 20. When the data based on pressure is at least a predetermined threshold, the controller 14 judges that a predetermined operation has been performed, and in response to the content of the operation, performs control to execute predetermined processing based, for example, on an application.

Furthermore, the pressure detector 20 can be configured in accordance with the contact detection system. For example, if the contact detection system is a resistive film system, the pressure detector 20 may be configured without using a strain gauge sensor, piezoelectric element, or the like by associating the magnitude of the resistance that corresponds to the size of the contact area with the load of the pressure on the touch face of the touch sensor. Alternatively, if the touch sensor uses a capacitive type system, a configuration without a strain gauge sensor, a piezoelectric element, or the like may be adopted by associating the magnitude of the capacitance with the load of the pressure on the touch sensor.

Figure 9:
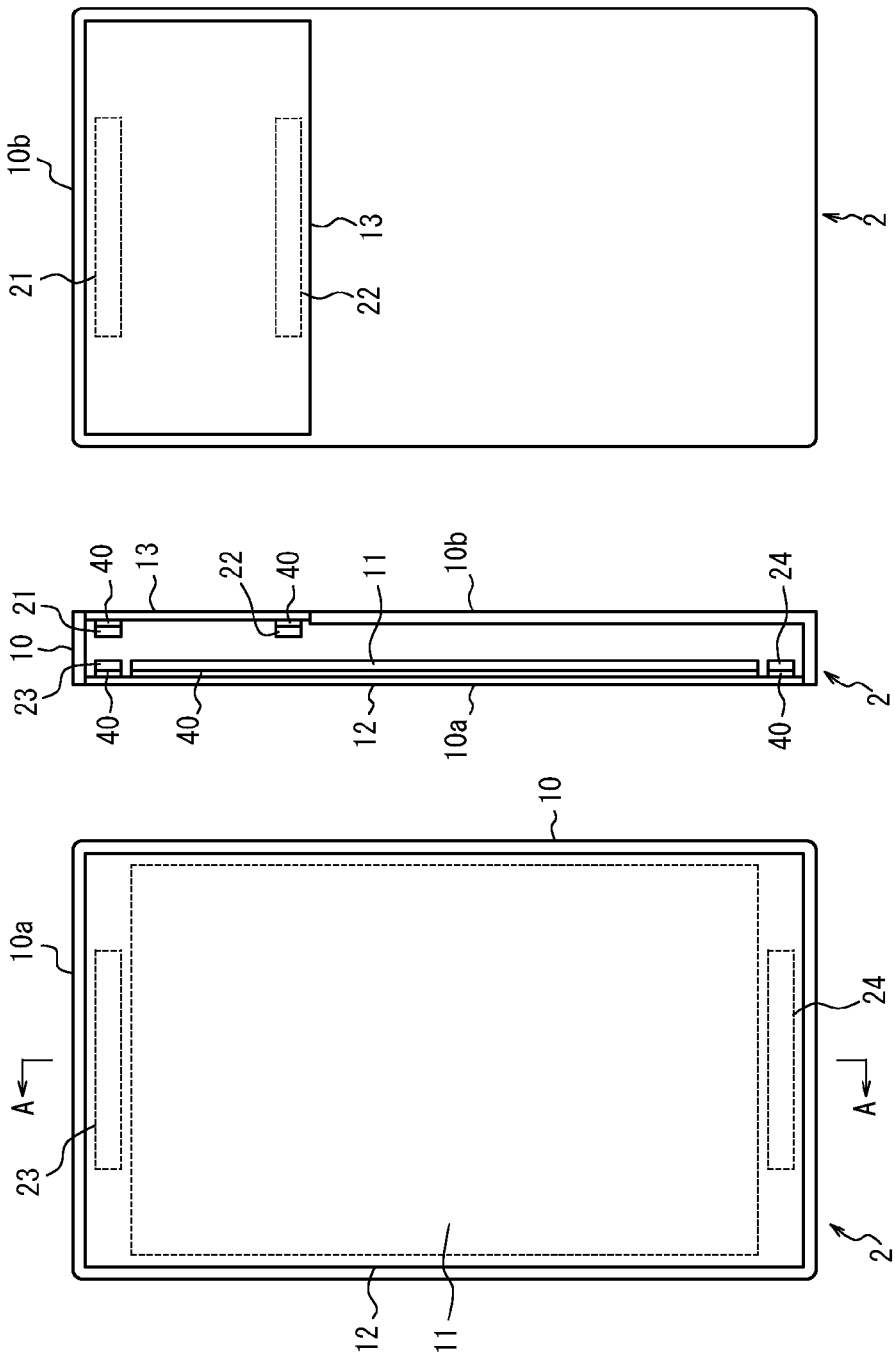
FIGS. 9A, 9B, and 9C illustrate an example of a mounting structure of the electronic device according to Embodiment 2.

FIGS. 9A, 9B, and 9C illustrate an example of a mounting structure of the electronic device 2 according to Embodiment 2. FIG. 9A is a front view, FIG. 9B is a cross-sectional view along the A-A line in FIG. 9A, and FIG. 9C is a back view. FIGS. 9A to 9C illustrate the mounting structure of the electronic device 1 in FIGS. 2A to 2C with the addition of piezoelectric elements 21 to 24 that form the pressure detector 20. The number and arrangement of the piezoelectric elements is not limited to the illustrated example.

In the example in FIGS. 9A to 9C, the pressure detector 20 includes a first piezoelectric element 21, a second piezoelectric element 22, a third piezoelectric element 23, and a fourth piezoelectric element 24, uses the first piezoelectric element 21 and the second piezoelectric element 22 to detect pressure when the user performs an operation on the back surface touch sensor 13, and uses the third piezoelectric element 23 and the fourth piezoelectric element 24 to detect pressure when the user performs an operation on the front surface touch sensor 12.

In FIG. 9A, in the area on the front surface touch sensor 12 where the display by the display 11 does not need to be visible, i.e. the area where the front surface touch sensor 12 and the display 11 do not overlap, the area near the edges of the front surface touch sensor 12 is preferably painted or covered with a bezel. The third piezoelectric element 23, fourth piezoelectric element 24, and the like can thus be prevented from being seen from the exterior of the electronic device 2.

Figure 10:
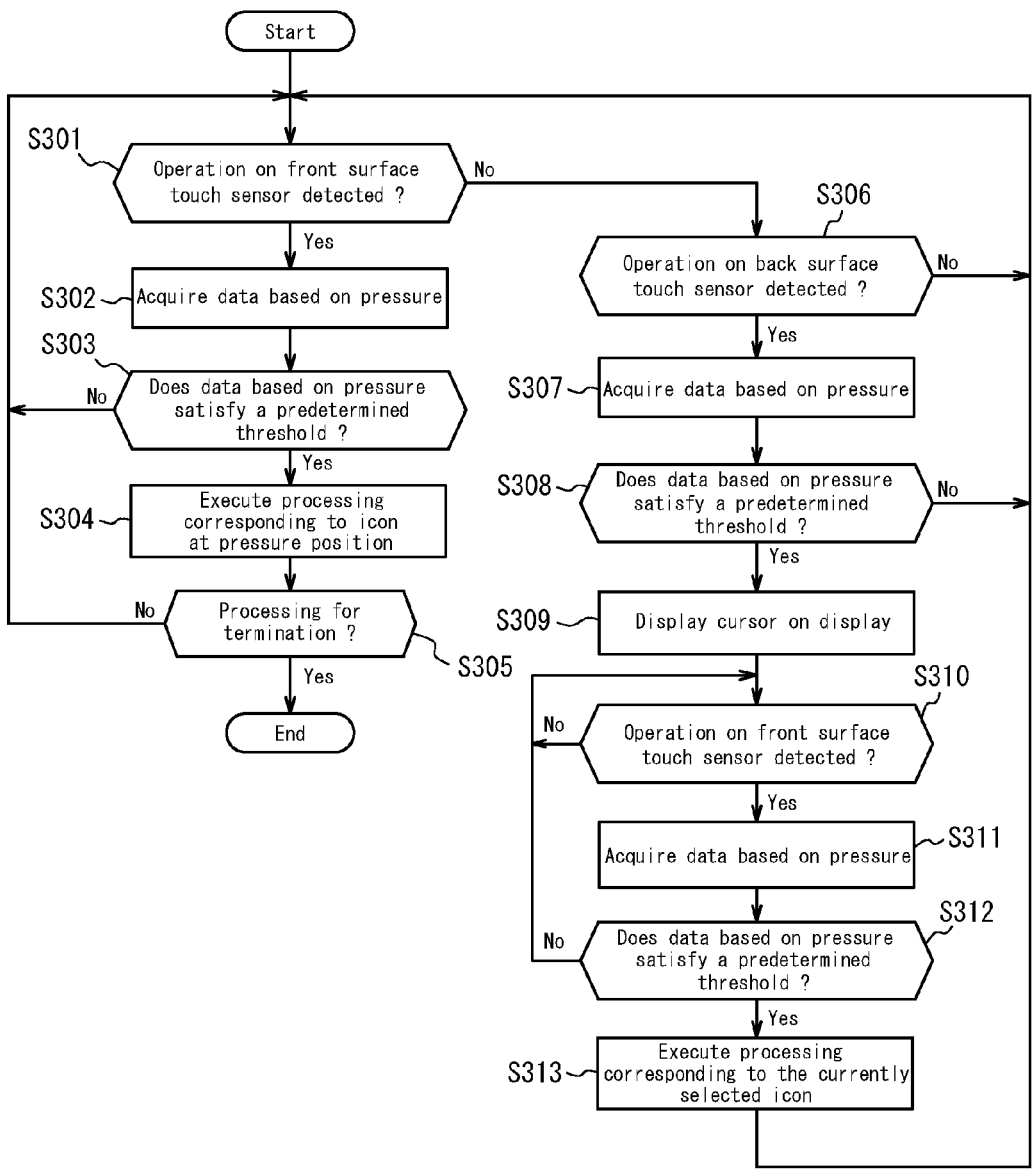
FIG. 10 is a flowchart illustrating icon operation processing by the electronic device according to Embodiment 2.

Next, processing by the electronic device 2 according to one of the embodiments of this disclosure is described. FIG. 10 is a flowchart illustrating processing by the electronic device 2 according to Embodiment 2.

Upon detecting a predetermined operation on the front surface touch sensor 12 by a signal input from the front surface touch sensor 12 (step S301: Yes), the controller 14 acquires data based on pressure on the front surface touch sensor 12 from the pressure detector 20 (step S302). The controller 14 then determines whether the acquired data based on pressure satisfies a predetermined threshold (standard) (step S303), and when the data based on pressure satisfies a predetermined threshold (step S303: Yes), the controller 14 judges that a pressure operation has been performed on the front surface touch sensor 12 and executes processing corresponding to the icon displayed at the pressure position (step S304). Stating that the data based on pressure satisfies a predetermined threshold may refer to when data based on pressure has reached a predetermined standard value, to when data based on pressure has exceeded a predetermined standard value, or to when data based on pressure equivalent to a predetermined standard value has been detected. When the processing in step S304 is processing to close an application, a menu, or the like (step S305: Yes), the controller 14 terminates processing and for example causes a home screen (standby screen) to be displayed on the display 11.

Upon detecting a predetermined operation on the back surface touch sensor 13 by a signal input from the back surface touch sensor 13 (step S306: Yes), the controller 14 acquires data based on pressure on the back surface touch sensor 13 from the pressure detector 20 (step S307). The controller 14 then determines whether the acquired data based on pressure satisfies a predetermined threshold (standard) (step S308), and when the data based on pressure satisfies a predetermined threshold (step S308: Yes), the controller 14 judges that an operation has been performed on the back surface touch sensor 13 and causes a cursor for selecting an icon positioned at the upper portion of the display 11 to be displayed on the display 11 (step S309).

The cursor can be moved within the selectable area by a predetermined operation (for example, a slide) on the back surface touch sensor 13. After displaying (and moving) the cursor in step S309, upon detecting a predetermined operation on the front surface touch sensor 12 (step S310: Yes), the controller 14 acquires data based on pressure on the front surface touch sensor 12 from the pressure detector 20 (step S311). The controller 14 then determines whether the acquired data based on pressure satisfies a predetermined threshold (standard) (step S312), and when the data based on pressure satisfies a predetermined threshold (step S312: Yes), the controller 14 judges that a pressure operation has been performed on the front surface touch sensor 12 and executes processing corresponding to the icon selected by the cursor (step S313).

Figure 11:
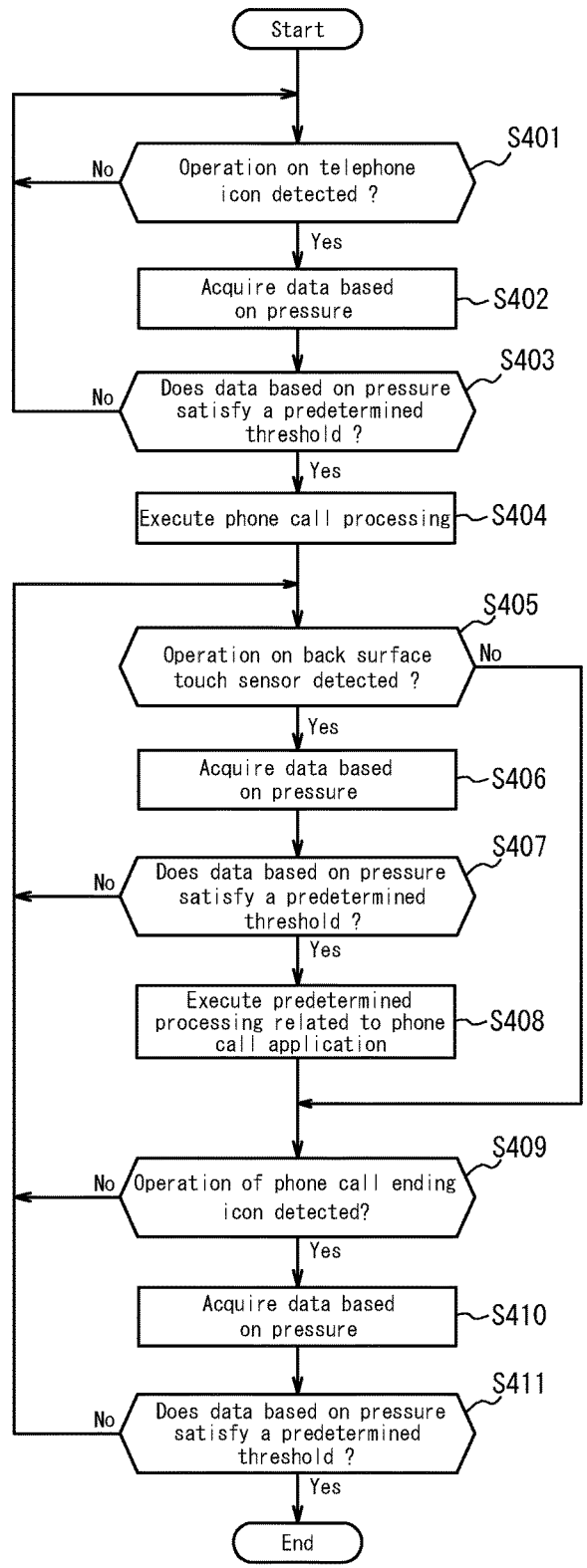
FIG. 11 is a flowchart illustrating processing related to a phone call application by the electronic device according to Embodiment 2.

The processing related to a phone call application is described with reference to FIG. 11. FIG. 11 is a flowchart illustrating processing related to a phone call application by the electronic device 1 according to Embodiment 2.

When the display 11 is displaying a telephone icon for placing a phone call, then upon detection of an operation with the front surface touch sensor 12 at the display position of the telephone icon (step S401: Yes), data based on pressure on the front surface touch sensor 12 is acquired from the pressure detector 20 (step S402). The controller 14 then determines whether the acquired data based on pressure satisfies a predetermined threshold (standard) (step S403), and when the data based on pressure satisfies a predetermined threshold (step S403: Yes), the controller 14 judges that a pressure operation on the telephone icon has been performed on the front surface touch sensor 12 and executes phone call processing (step S404). Stating that the data based on pressure satisfies a predetermined threshold may refer to when data based on pressure has reached a predetermined standard value, to when data based on pressure has exceeded a predetermined standard value, or to when data based on pressure equivalent to a predetermined standard value has been detected.

Upon detecting a predetermined operation on the back surface touch sensor 13 by a signal input from the back surface touch sensor 13 during a phone call (step S405: Yes), the controller 14 acquires data based on pressure on the back surface touch sensor 13 from the pressure detector 20 (step S406). The controller 14 then determines whether the acquired data based on pressure satisfies a predetermined threshold (standard) (step S407), and when the data based on pressure satisfies a predetermined threshold (step S407: Yes), the controller 14 judges that a predetermined operation has been performed on the back surface touch sensor 13 and executes predetermined processing related to a phone call application (step S408). The predetermined processing is as described in Embodiment 1.

Upon detecting an operation at the display position of an end phone call icon for terminating the phone call (step S409: Yes), the controller 14 acquires data based on pressure on the back surface touch sensor 13 from the pressure detector 20 (step S410). The controller 14 then determines whether the acquired data based on pressure satisfies a predetermined threshold (standard) (step S411), and when the data based on pressure satisfies a predetermined threshold (step S411: Yes), the controller 14 terminates the phone call, ends the phone call processing, and for example causes the home screen (standby screen) to be displayed on the display 11. In the flowchart in FIG. 11, the case of terminating the phone call by operating the end phone call icon is illustrated, but when terminating the phone call by an operation on the back surface touch sensor 13, the phone call is terminated in step S408, and the phone call processing ends.

As described above, the electronic device 2 according to Embodiment 2 further includes the pressure detector 20, and when data based on pressure on the back surface touch sensor 13 satisfies a predetermined threshold, the controller 14 judges that an operation has been performed on the back surface touch sensor 13. Therefore, a judgement that the user has performed an operation can be prevented when the electronic device 2 has merely contacted another object lightly. In particular, when the user holds the electronic device, the fingers contact the back surface, but by having the pressure detector 20 detect pressure, an incorrect judgement that the user performed an operation when in fact the user had no intention of doing so can be prevented.

Embodiment 3

Figure 12:
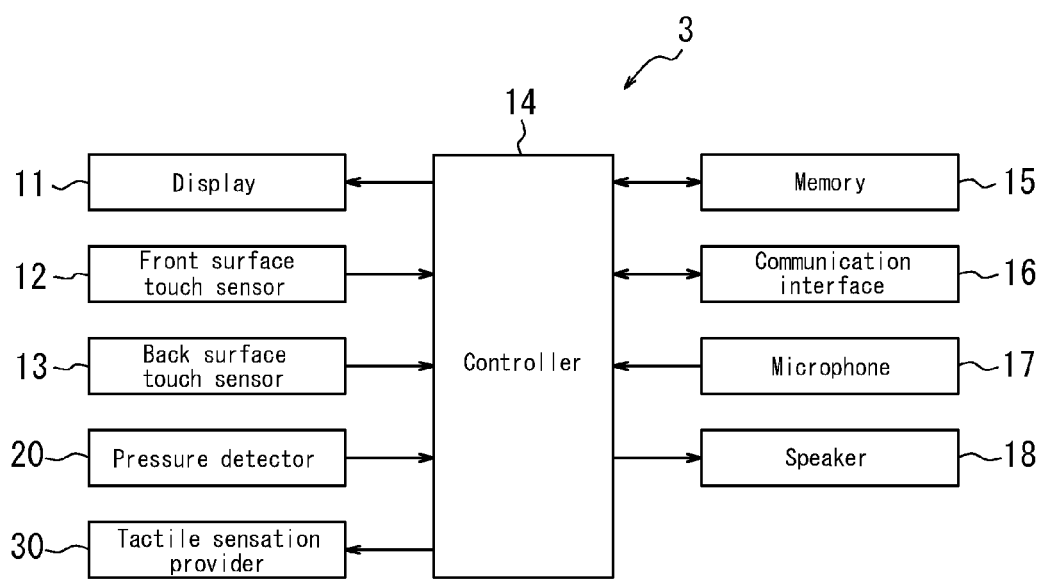
FIG. 12 is a block diagram schematically illustrating the structure of an electronic device according to Embodiment 3.

Next, Embodiment 3 is described. FIG. 12 is a block diagram schematically illustrating the structure of an electronic device according to Embodiment 3. As compared to the electronic device 2 according to Embodiment 2, an electronic device 3 according to Embodiment 3 further includes a tactile sensation provider 30. The remaining structure is identical to that of Embodiment 2. Therefore, the same reference signs are applied, and a description thereof is omitted.

The tactile sensation provider 30 generates a predetermined vibration based on a drive signal provided by the controller 14. It suffices for the drive signal to be a drive signal that expresses vibration, at the position contacted by the finger, corresponding to behavior of a real button that is to be expressed.

The tactile sensation provider 30 is configured using a piezoelectric element, an ultrasonic transducer, a vibration motor (eccentric motor), or the like, and by generating vibration with a predetermined vibration pattern, provides a tactile sensation to the user's finger pressing the back surface touch sensor 13, thereby providing the user with a sensory understanding that the back surface touch sensor 13 has been operated. Without using a mechanical vibration, the tactile sensation provider 30 may provide a tactile sensation to the user's finger pressing the back surface touch sensor 13 for example by controlling the electric charge of a film adhered onto the back surface touch sensor 13.

The tactile sensation provider 30 may also similarly generate vibration for the front surface touch sensor 12 to provide a tactile sensation to the user's finger pressing the front surface touch sensor 12.

The tactile sensation provider 30 may be configured integrally with the pressure detector 20. In particular, when the pressure detector 20 and the tactile sensation provider 30 are both configured using a piezoelectric element, they may be configured to share a common piezoelectric element. The reason is that a piezoelectric element generates voltage when pressure is applied and deforms upon application of voltage. An example of a mounting structure for this case is as illustrated in FIGS. 9A to 9C.

In the case of configuring the pressure detector 20 and the tactile sensation provider 30 with a piezoelectric element, when the voltage value of the piezoelectric element satisfies a predetermined threshold, the controller 14 may execute predetermined processing and generate vibration by driving the piezoelectric element. Stating that the voltage value of the piezoelectric element satisfies a predetermined threshold may refer to when the voltage value has reached a predetermined standard value, to when the voltage value has exceeded a predetermined standard value, or to when a voltage value equivalent to a predetermined standard value has been detected.

As described above, the electronic device 3 according to Embodiment 3 further includes the tactile sensation provider 30 and generates a predetermined vibration based on a drive signal provided by the controller 14. Therefore, when the user operates the back surface touch sensor 13 (and the front surface touch sensor 12), the electronic device 3 can provide the user with a sensory understanding that the intended operation has been performed.

The above embodiments have been described as representative examples, but it will be apparent to one of ordinary skill in the art that numerous modifications and replacements may be made within the spirit and scope of this disclosure. Therefore, this disclosure should not be interpreted as being restricted to the above-described embodiments. A variety of changes and modifications may be made without departing from the scope of the appended claims. For example, a plurality of the structural blocks described in the embodiments may be combined into one, or one structural block may be divided into multiple parts.

REFERENCE SIGNS LIST 1, 2, 3 Electronic device
11 Display
12 Front surface touch sensor
13 Back surface touch sensor
14 Controller
15 Memory
16 Communication interface
17 Microphone
18 Speaker
20 Pressure detector
21 First piezoelectric element
22 Second piezoelectric element
23 Third piezoelectric element
24 Fourth piezoelectric element
30 Tactile sensation provider
40 Joining member

The invention claimed is:

1. An electronic device comprising:
a touch sensor on a front surface and a touch sensor on a back surface; and
a controller configured to cause a cursor for selecting an icon positioned at an upper portion of a display to be displayed upon detecting an operation on the touch sensor on the back surface and configured to execute processing corresponding to an icon selected by the cursor upon detecting an operation on the touch sensor on the front surface,
wherein the controller causes the cursor for selecting the icon in a predetermined area positioned at the upper portion of the display to be displayed,
wherein, while the cursor is being displayed, the controller causes the predetermined area to display in a first state indicating the predetermined area is a selectable area,
wherein the selectable area is configured to display the cursor in response to the operation on the touch sensor on the back surface, and
wherein, while the cursor is being displayed, the controller causes an area of the display other than the predetermined area to display in a second state different from the first state and indicating the area is not the selectable area.

2. The electronic device of claim 1, wherein, in the second state, while the cursor is being displayed, the controller grays out the area of the display other than the predetermined area.

3. The electronic device of claim 1, wherein while the cursor is being displayed, the controller does not execute the processing corresponding to the icon selected by the cursor until detecting the operation on the touch sensor on the front surface.

4. The electronic device of claim 1, further comprising a pressure detector configured to detect pressure on the touch sensor on the back surface,
wherein the controller detects the operation on the touch sensor on the back surface when data based on pressure detected by the pressure detector satisfies a predetermined standard.

5. The electronic device of claim 1, wherein determination of the selectable area is predetermined, and determination of the area of the display other than the predetermined area to display in the second state different from the first state and indicating the area is not the selectable area is predetermined.

6. The electronic device of claim 1, wherein the controller causes the predetermined area to include the upper portion and one side portion of the display to be displayed.

7. The electronic device of claim 1, wherein the controller causes the predetermined area to include the upper portion, one side portion of the display to be displayed, and a corner portion of the display to be displayed.

8. An electronic device for use by a user having an ear, wherein, during a phone call using the electronic device, the user brings the electronic device close to the ear of the user, the electronic device comprising:
a touch sensor on a front surface and a touch sensor on a back surface; and
a controller configured to execute processing related to a phone call application upon detecting an operation only on the touch sensor on the back surface during the phone call and during which the electronic device is brought close to the ear of the user.

9. The electronic device of claim 8, wherein the controller terminates the phone call upon detecting the operation on the touch sensor on the back surface during the phone call.

10. The electronic device of claim 8, wherein the controller records the phone call upon detecting the operation on the touch sensor on the back surface during the phone call.

11. The electronic device of claim 8, wherein the controller raises a volume of a speaker upon detecting a first operation on the touch sensor on the back surface during the phone call and lowers the volume of the speaker upon detecting a second operation on the touch sensor on the back surface during the phone call.

12. The electronic device of claim 8, wherein, during the phone call and during which the electronic device is brought close to the ear of the user, the phone call application is adjusted by operating the back surface touch sensor, and the controller changes an attribute of the electronic device upon detecting a first operation on the back surface touch sensor and adjusts the attribute of the electronic device upon detecting a second operation on the back surface touch sensor, whereby the attribute of the electronic device is easily adjusted while preventing interruption of the phone call.

13. The electronic device of claim 8, wherein
the electronic device comprises a button,
the button is configured to be pressed while the user uses the electronic device so as to adjust the attribute of the electronic device, and
the controller is redundantly configured to adjust the attribute of the electronic device with the operation on the back surface touch sensor without a need for the user to operate the button during the phone call and during which the electronic device is brought close to the ear of the user.

14. The electronic device of claim 8, wherein a function of the phone call application is activated by operating the back surface touch sensor during the phone call, and upon detecting a predetermined operation on the back surface touch sensor during the phone call, the controller is configured to activate the function, whereby the function is easily performed while preventing interruption of the phone call.

15. An electronic device configured for improved operability when operating the electronic device with one hand, the electronic device comprising:
a touch sensor on a front surface and a touch sensor on a back surface, wherein the back surface touch sensor has a first area that is less than half a second area of the front surface touch sensor, and the back surface touch sensor is provided only on an upper portion of the electronic device; and
a controller configured to cause a cursor for selecting an icon positioned at an upper portion of a display to be displayed upon detecting an operation on the touch sensor on the back surface and configured to execute processing corresponding to an icon selected by the cursor upon detecting an operation on the touch sensor on the front surface,
wherein the controller causes the cursor for selecting the icon in a predetermined area positioned at the upper portion of the display to be displayed,
wherein, while the cursor is being displayed, the controller causes the predetermined area to display in a first state indicating the predetermined area is a selectable area,
wherein the selectable area is configured to display the cursor in response to the operation on the touch sensor on the back surface, and
wherein, while the cursor is being displayed, the controller causes an area of the display other than the predetermined area to display in a second state different from the first state and indicating the area is not the selectable area.

16. The electronic device of claim 15, wherein the upper portion of the display corresponds with a range difficult to reach with a thumb when a user operates the electronic device with one hand.

17. The electronic device of claim 15, wherein determination of the selectable area is predetermined, and determination of the area of the display other than the predetermined area to display in the second state different from the first state and indicating the area is not the selectable area is predetermined.

18. The electronic device of claim 15, wherein the controller causes the predetermined area to include the upper portion and one side portion of the display to be displayed.

19. The electronic device of claim 15, wherein the controller causes the predetermined area to include the upper portion, one side portion of the display to be displayed, and a corner portion of the display to be displayed.

20. An electronic device configured for improved operability when operating the electronic device with one hand, the electronic device comprising:
a touch sensor on a front surface and a touch sensor on a back surface, wherein the back surface touch sensor has a first area that is less than half a second area of the front surface touch sensor and the back surface touch sensor is provided only on an upper portion of the electronic device; and
a controller configured to execute processing related to a phone call application upon detecting an operation only on the touch sensor on the back surface during a phone call,
wherein, during the phone call and during which the electronic device is brought close to the ear of the user, the phone call application is adjusted by operating the back surface touch sensor, and the controller changes an attribute of the electronic device upon detecting a first operation on the back surface touch sensor and adjusts the attribute of the electronic device upon detecting a second operation on the back surface touch sensor, whereby the attribute of the electronic device is easily adjusted while preventing interruption of the phone call.

21. The electronic device of claim 20, wherein, when a display of the electronic device is displaying a telephone icon for placing the phone call, then upon detecting the operation with the touch sensor on the back surface at the display position of the telephone icon, the controller executes phone call processing by launching the phone call application and opening a phone line connection with a communication interface of the electronic device after a user of the electronic device inputs a telephone number, thereby allowing the user to hold the phone call with another party once the phone line connection is established.

22. The electronic device of claim 20, wherein, upon detecting an operation at a display position of the electronic device of an end phone call icon for ending the phone call, the controller terminates the phone call, ends phone call processing, and causes a home screen or standby screen to be displayed on the display.

23. The electronic device of claim 20, wherein, in order to adjust a volume of a speaker of the electronic device during the phone call, the volume of the speaker is adjusted by operating the touch sensor on the back surface during the phone call.

24. The electronic device of claim 23, wherein during the phone call, the controller raises the volume of the speaker upon detecting a first operation on the touch sensor on the back surface, and lowers the volume of the speaker upon detecting a second operation on the touch sensor on the back surface.

25. The electronic device of claim 24, wherein the first operation is a slide upwards from below, and the second operation is a slide downwards from above.

26. The electronic device of claim 20, wherein, upon detecting a predetermined operation on the touch sensor on the back surface during the phone call, the controller records the phone call.

27. The electronic device of claim 26, wherein the predetermined operation is a double tap.

28. An electronic device configured for improved operability when operating the electronic device with one hand, the electronic device comprising:
a touch sensor on a front surface and a touch sensor on a back surface, wherein the back surface touch sensor has a first area that is less than half a second area of the front surface touch sensor and the back surface touch sensor is provided only on an upper portion of the electronic device; and
a controller configured to execute processing related to a phone call application upon detecting an operation only on the touch sensor on the back surface during a phone call, wherein
the electronic device comprises a button, the button is configured to be pressed while the user uses the electronic device so as to adjust the attribute of the electronic device, and the controller is redundantly configured to adjust the attribute of the electronic device with the operation on the back surface touch sensor without a need for the user to operate the button during the phone call and during which the electronic device is brought close to the ear of the user.

29. An electronic device configured for improved operability when operating the electronic device with one hand, the electronic device comprising:

a touch sensor on a front surface and a touch sensor on a back surface, wherein the back surface touch sensor has a first area that is less than half a second area of the front surface touch sensor and the back surface touch sensor is provided only on an upper portion of the electronic device; and a controller configured to execute processing related to a phone call application upon detecting an operation only on the touch sensor on the back surface during a phone call, wherein a function of the phone call application is activated by operating the back surface touch sensor during the phone call, and upon detecting a predetermined operation on the back surface touch sensor during the phone call, the controller is configured to activate the function, whereby the function is easily performed while preventing interruption of the phone call.

\* \* \* \* \*